Nov. 10, 1959     T. K. VAN TUYL     2,912,163
APPARATUS FOR RECORDING AGGREGATE TOTALS
OF MEASUREMENTS OF PARAMETERS
Filed Oct. 19, 1956     2 Sheets-Sheet 1

INVENTOR
*THOMAS KITSON VAN TUYL* by R. J. Filipkowski
AGENT

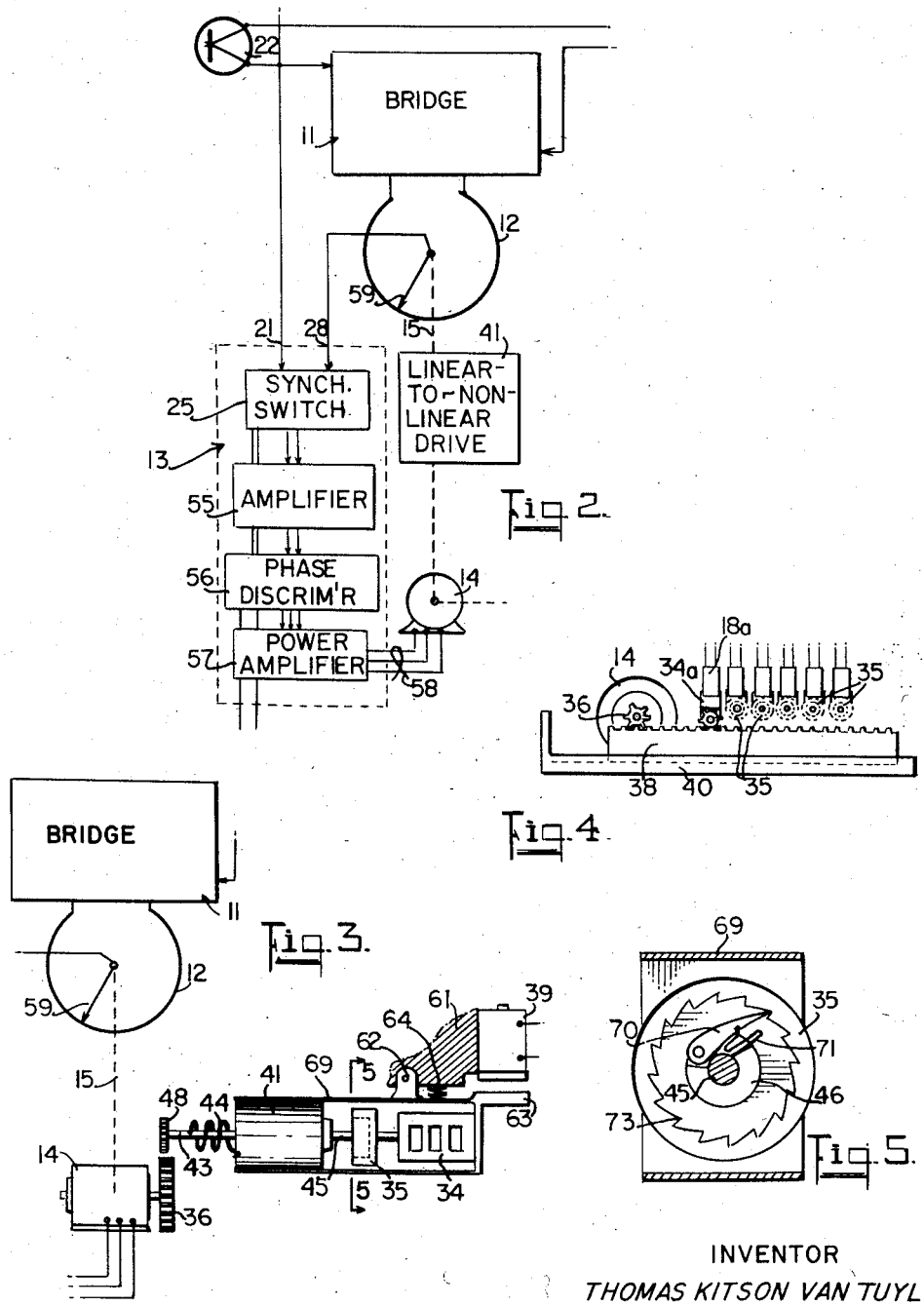

United States Patent Office 2,912,163
Patented Nov. 10, 1959

2,912,163

APPARATUS FOR RECORDING AGGREGATE TOTALS OF MEASUREMENTS OF PARAMETERS

Thomas Kitson Van Tuyl, Ottawa, Ontario, Canada, assignor to National Research Council, Ottawa, Ontario, Canada, a corporation Application October 19, 1956, Serial No. 616,965

9 Claims. (Cl. 235—183)

This invention relates to measuring systems for measuring the instantaneous values of a parameter as it varies from time to time, as for example the scale values of resistance, pressure, humidity, flow rate, barometric pressure, and many other variable physical parameters.

The invention particularly relates to means for providing readings of an aggregate total of magnitudes of a parameter as well as indicating the number of readings taken whereby to enable a simple division to be made to derive an average magnitude for the parameter over an observation interval.

Measuring systems for recording the variations of a parameter are known in the art, these usually comprising null seeking, self balancing instruments having for example a slide wire type of potentiometer and wiper mechanically actuated by a servo motor which sets the wiper position to establish a balance between an electrical signal generated by a sensing element and the value of the potential tapped by the wiper. Certain systems of this type include a marking pen or a printing wheel actuated by the motor in accordance with the wiper setting and a roll record upon which the pen or wheel marks the value of the reading. A progression of readings taken at different times may be recorded in chronological relation upon a chart which moves at constant speed in one direction, for example under drive by a clockwork motor.

Heretofore wherever it was required to average a group of readings of temperature, strain, pH, or other parameter being recorded upon automatic printing or chart making recorders, there has been no facility whereby this could be directly carried out. The observer has been obliged to read chart markings or a printed record and to sum the individual readings for each parameter noted therefrom on an adding machine or other totalizer, before performing the division of the number of readings taken into the aggregate sum totalled. Such procedure is tedious and costly in man hours and has been found susceptible to human error in transcribing data and in obtaining the aggregate totals.

By the practice of the invention, apparatus is provided whereby it becomes a relatively simple matter to extract a mean magnitude from a total which has been automatically carried forward as each instantaneous value of the parameter has been recorded from time to time within the period under observation. An average, for example, of temperature readings in a space over a given span of time may be derived at any time during the test or thereafter by merely dividing the reading of a counter associated with the recording equipment serving a temperature sensing element by the number of readings that have been so totalled.

The present invention is particularly concerned with arrangements for converting the settings of the slide wire of a potentiometer of the servo-driven self-balancing type referred to a reference position into increments of angular displacement of a counter shaft and for adding each such increment as the reading is made to the sum of all previous increments.

The invention further resides in a recording system and apparatus wherein each of a plurality of sensing elements is read in turn by converting the voltage output thereof into a representative setting of a potentiometer and the magnitude of each reading is established as an increment, first by setting the balancing network to zero and the wiper position to a reference or zero scale value, then establishing the value of the increment as an angular displacement of a counter proportional to the sweep of the wiper as the latter is moved into a position corresponding with the scale value of the reading.

It is therefore a primary object of the invention to provide a relatively compact, simple equipment for measuring and recording the instantaneous values of a parameter at periodic intervals and totalling each reading in a totalizer while recording also the number of readings taken.

It is another object of the invention to provide a recording system wherein the scale magnitudes of the readings may be converted by the use of non-linear to linear translation devices as for example where the parameter is sensed by a device whose output signal voltage is related of the parameter as a non-linear function of the latter.

It is also an object of the invention to provide apparatus for use with a large number of sensing elements for various parameters all of which are successively recorded within the same test period and whose aggregate totals are carried forward on separate counters.

For a more detailed understanding of the invention and for illustration of various improvements thereto, reference is made to the accompanying drawings in which—

Fig. 2 is a diagram of a portion of the apparatus of Fig. 1 wherein a linear-to-non-linear drive is interposed in the servo-drive mechanism between the motor and the slide-wire wiper;

Fig. 3 is an illustration of elements forming individual non-linear to linear function converters associated with the drives of each summing device of the embodiment of Fig. 1;

Figure 4 is a view of a rack and pinion mechanism for summing increments; and

Fig. 5 is a cross-section view of a pawl-and-ratchet unidirectional drive for a summing counter, taken on line 5—5 of Fig. 3.

Figure 1:
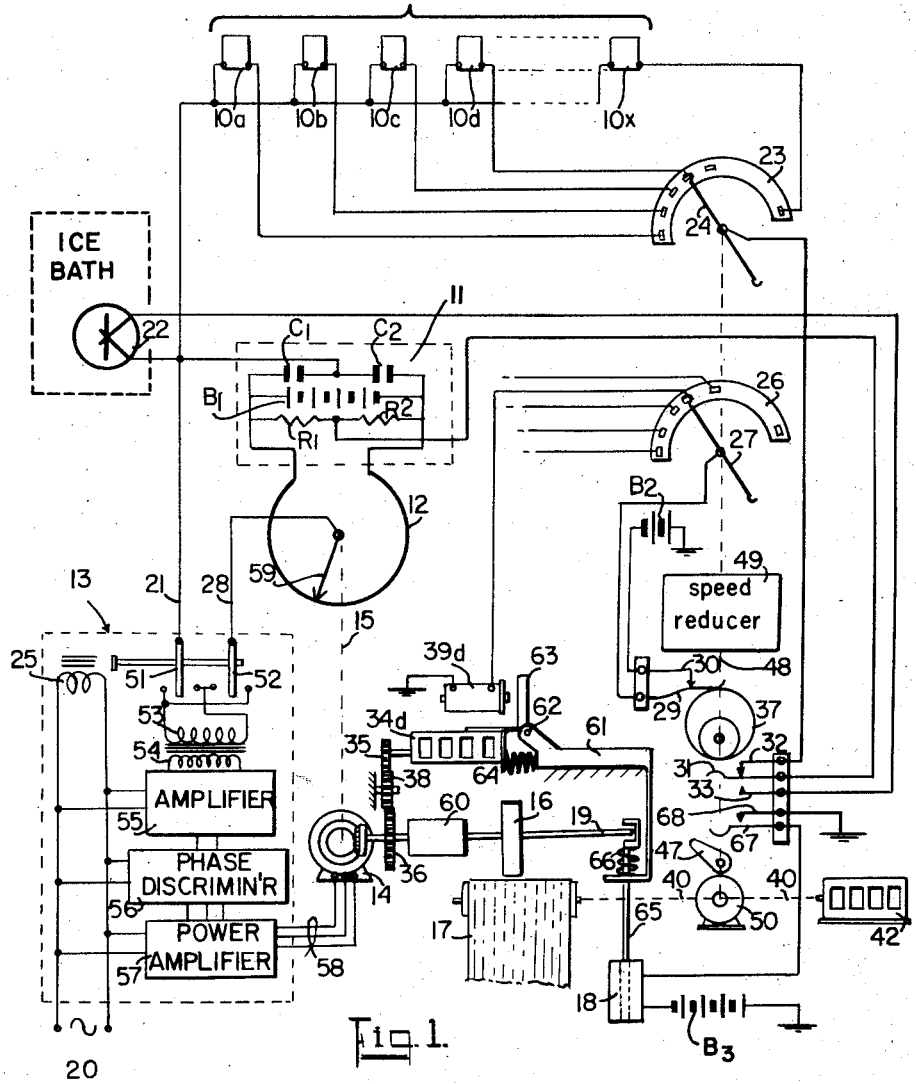
Figure 1 is a schematic illustration of a recorder system according to the present invention including a plurality of sensing elements and a like plurality of corresponding counter elements upon which totals of all readings for each respective sensing element are registered.

Referring to Figure 1 there is disclosed a system according to the present invention wherein a plurality of sensing elements 10a, 10b, 10c, 10d ... and a like plurality of electromagnets 39a, 39b, 39c, 39d ... of which only 39d is shown, and an associated series of counters including respective counter 34d, are employed in a system for summing readings. Each of the elements 10a, 10b, etc. generally indicates a sensing element capable of generating an electrical signal whose absolute voltage is a function of the magnitude of the parameter under observation; for example it may comprise a resistance element forming a part of a voltage dividing circuit whereby due to the temperature coefficient of the resistance the voltage at one terminal thereof represents the scale value of the temperature or it may preferably comprise a thermo-couple producing a voltage related to temperature or to received radiation; or it may be any one of many other primary measuring elements capable of generating an electrical signal output in response to a physical state.

Block 11 which is marked in dotted outline, generally designates a potentiometer network which establishes an electrical reference voltage, in which the slide wire 12 is included, including a wiper 59 for selecting a potential.

A primary source of reference potential such as the battery B1 is connected to the ends of the slide wire 12. A resistance divider network comprising the resistances R1 and R2 in series is shunted across the battery. Similarly a capacitance network comprising the capacitors C1 and C2 connected in series is also shunted across the battery. The values of R1 and R2 are chosen to be precisely equal, thereby establishing a predetermined reference potential at their midpoint, there being a corresponding potential at a predetermined position along the slide wire 12, the latter preferably having uniform potential drop along its length. One terminal of each of the sensing elements 10a, b, c, etc., and a terminal of a reference element 22, are connected in common, to the mid-point between the capacitors. Each of the sensing elements has its other signal output lead terminating on a segment along the arc 23 of a rotary switch along which a corresponding wiper 24 progresses. As will be explained in further particular hereafter, one of the sensing elements 10a, b, etc. is connected in a comparison circuit when the wiper 24 rests on the corresponding signal output terminal of that element, thereby connecting it at a particular time to the mid-point of the resistance pair R1, R2. Accordingly, the potential of the common lead 21 will differ from the predetermined battery potential by the amount of the signal voltage generated in the selected element, as the algebraic sum of the voltage with respect to the potential of the midpoint of the shunt. The potential on the lead 28, connected with the wiper 59 of the slide wire 12, will depend on the position of the wiper; accordingly, any difference in potential, due to unbalance of the potentiometer, will be impressed upon the moving poles 51, 52 of a synchronous switch associated with the primary 53 of a signal input transformer. The block indicated in dotted outline as 13 generally comprises an amplifier connected in a servo-system, for feeding a correcting signal to the servo-motor 14, by which the position of the wiper 59 is adjusted for equality with the potential on lead 21. It is believed that such apparatus is well understood by persons skilled in the art, so that only a brief description of its operation will suffice here. In the diagram, a source of alternating current is introduced by the terminals 20, to power a synchronous vibrator winding 25, whereby the switch poles 51 and 52 synchronously and alternately connect the leads 21 and 28 to the ends of the primary winding 53. Accordingly, any direct voltage existing between the terminals 21 and 28 is converted into an A.C. signal appearing at the output of the secondary 54, which signal is applied to the amplifier 55. The output of the amplifier is compared in phase with the phase of the A.C. source as a standard, to determine any reversal of phase condition, and the signal representing the phase is also passed to the power amplifier 57, whose output serves to drive reversible motor 14 in one direction or the other depending on the sign of the signal. Motor 14 may comprise for example a polyphase bi-directional motor, which is mechanically coupled by the link 15 to rotate the wiper along the slide wire 12 so that the potential on lead 28 is brought into correspondence with that on lead 21. Mechanically ganged with link 15 is a marker wheel 16 rotatable with the shaft 19, the wheel being ordinarily out of engagement with a roller supported record strip 17. At intervals in accordance with timing provisions hereinafter to be described, the electromagnet 18 causes the shaft 19 to be drawn down and cause the wheel 16 to strike and mark the record. Ordinarily the record strip 17 moves uniformly as under clockwork drive whereby at periodic intervals readings are recorded to provide a continuous chart of the instantaneous values measured by an element such as 10a, b, etc.

Mechanically ganged with the wiper 24 is a wiper 27 which moves along a second arc 26 upon whose segments the leads from respective counter actuating electromagnets 39a, b, c, d, of which only 39d is shown, are terminated. From the wiper 24 the connection is made to a contact point 32 of a single pole double throw cam actuated switch, whose spring strip 31 is periodically and cyclically actuated by the cam 37. The shaft of the latter is arranged to be mechanically ganged with the rotation of a drive motor 50, by a direct mechanical coupling 48, there being provided a further coupling in the form of a speed reducer 49 between the drive link 48 and the wipers 24 and 27, so that the latter rotate a distance between successive terminals of the arcs 23 and 26, in the interval of one revolution of cam 37.

When the cam 37 is in the position illustrated in Fig. 1, the sensing element 10d is included in the measuring circuit, by way of spring 31 which extends the circuit by way of normally closed contact 32 whereby to apply the sensed voltage between the centre tap of R1, R2, and the common lead 21. In accordance with the functions ascribed previously to the amplifier group 13 and servomotor 14, the slide wire wiper 59 will be displaced along the slide wire 12 in such sense as to reduce the difference between leads 21 and 28 and restore a balance. Accordingly, as when the element 10d is a thermocouple, the wiper position on the slide wire 12 signifies the temperature of the space in which the element is set.

When cam 37 is in a position displaced a pre-determined angular distance from that shown, as will be described hereinafter in further detail, the spring strip 31 is moved into contact with the point 33, thereby disconnecting the sensing element 10d from the network and substituting a fixed element 22 which may be a standardized sensing element. While a zero or reference value might be established by connecting a predetermined voltage in lieu of the element 22, in measurements of temperature it is preferable to employ a stabilized thermocouple held at constant temperature, for example at 32 degrees Fahrenheit. When the latter is connected into the circuit, the wiper 59 of slide wire 12 will be adjusted to the position corresponding to a temperature whose scale value is 32 degrees Fahrenheit and the setting motor 14 and marker wheel 16 and counter-actuating wheel 36 will be correspondingly positioned.

A counter 34d of a plurality of counters is pivotally supported on a frame 61, pivoting upon hinge 62 therein, and is biased, as by suitable spring means 64, to a position of rest in which its shaft and associated pinion 35 are out of engagement with the gear 36 of slide-wire drive motor 14. The counter is furthermore fixed upon the armature 63 of its respective electromagnet such as 39d illustrated, whereby as the winding is energized the counter is swung into a position wherein its pinion is engaged with the gear periphery of gear 36. Where a large multiplicity of counters are to be operated from a common drive gear 36 each may preferably have its gear 35 spaced by interposing an idler 38 journalling in the frame.

An additional counter 42, coupled as by drive link 40, and ganged with the driving motor 50 which rotates the cam and moves the wipers 24 and 27, is arranged to accumulate the total of cycles of events corresponding to the number of readings taken; this total is displayed on the counter for use in performing the division of sums totalled on counters 34a, 34b, etc. to obtain average values of readings for each element.

In order to obtain the addition of the reading measured by element 10d as a quantity stored into the counter, a particular timing of the make and break conditions of spring strips 29 and 31 is required. Commencing the cycle at a time when spring strip 31 extends the circuit over contact 33, and the sensing element is disconnected, the electromagnet 39d is also de-energized by the break condition of spring strip 29 relative to point 30. After cam 37 has rotated by at least 90 degrees, and at a time when wipers 24 and 27 are just initiating contact with their segments of arc, the spring strip 29 makes contact with point 30 to energize relay 39d from battery B2 and thereby to engage the counter with the drive motor, the slide wire being at the zero or reference position. At a predetermined further angular displacement of the cam the spring strip 31 contacts point 32; accordingly the motor 14 becomes energized, to commence the sweep of the slide wire wiper. The reference element becomes disconnected to leave only element 10d effective as input to potentiometer bridge, as spring strip 31 breaks contact with point 33. After a further interval strip 29 breaks contact with point 30, de-clutching the counter; upon further rotation of the drive the wipers leave their segments and the reference signal is re-connected, commencing the cycle for the next element in the group.

In a similar manner for each reading, the motor 14 drives the slide wire wiper to the position balancing the signal input from the element, the respective counter remaining clutched with the shaft of the motor whereby it is rotated to sum the increment corresponding to the difference between the zero or reference point and the instantaneous scale value of the parameter being measured.

The marking of the scale value of the reading is established by print wheel 16 which is ordinarily out of engagement with the roller-supported record 17 as by reason of a biasing spring 66. At intervals just prior to rotation of wipers 24 and 27 into contact with the next segments of their arcs, and while the slide wire drive motor remains at the setting which is the scale value of the reading, the solenoid 18 draws down a core affixed to a coupling 65, thereby pulling down arm 19 to cause the wheel 16 to mark the record. For this purpose commutator 47 ganged with the cam 37 may be arranged for briefly energizing the solenoid 18 at times corresponding to the static position of wiper 59 when representing readings.

The wipers 24 and 27 are preferably double-ended so that after they have passed over the arc, further rotation commences the sequence of readings. Suitable driving means 50 for the wipers and cam 37 may be realized as a diversity of devices, such as stepping motors, periodic motion mechanisms, or continuously running constant speed motors. The exact nature of such driving source per se forms no part of the present invention and may be varied to suit the particular requirements of the application which the system serves.

The electromagnets 39a,b,c, . . . and their respective counters 34a,b,c, . . . may be spaced about the periphery of a large diameter disc or ring gear 36, or the counters may be aligned in a row with their pinions 35 uniformly spaced out of engagement with a rack 38 which is reciprocable along a guide 40 whose axis is parallel with the line of pinions. As illustrated in Figure 4, motor 14 bears a pinion 36 which remains engaged with the rack and drives the latter between the zero or reference position and each scale value position representing a measurement. A selected counter 34a is engaged with the rack upon the actuation of a supporting electromagnet 18a, prior to the linear displacement of the rack to the scale reading. When the reading has been recorded, the counter is released, and the rack is returned by the motor to the reference position prior to the engagement of the next counter's pinion, as has been described with reference to Figure 1.

A number of sensing elements employed in the instrumentation art generate electric voltage outputs which are not linearly related to the scale magnitudes of the parameters which they measure; it is a fact that the majority of such devices have outputs which are generally complex functions of the absolute value of the parameter. The measuring system described necessitates certain modifications to permit summing of scale readings with linear type counters, that is, with counters which operate in the usual decade system. Accordingly, where a group of identical sensing elements 10a, 10b, 10c . . . are served by a common recorder, the slide wire 12 may be non-linearized by known techniques whereby the ratio of angular position of the wiper to the electrical voltage tapped therealong represents the function of output voltage of the element with respect to absolute value of the parameter. In order to make use of available recorders which are generally constructed with a linear slide-wire, on which the magnitude of the voltage tapped bears a straight-line relationship to angular position of the wiper, it is possible to modify the link 15 between motor 14 and the wiper of slide wire 12 as in Figure 2 to achieve the same result. In this embodiment a cam 41 is interposed between the wiper and the motor so that while the gear 36 or rack 38 operate linearly the angular displacement of the wiper is caused to obey the function correlating electrical output of the element with absolute value of the parameter. Alternatively, a function-generating gear train or pulley system or a linkage system may be incorporated in the device 41 for the purpose of obtaining linear output of the recording system despite the non-linear voltage relationship of the sensing element output with respect to parameter magnitude.

The elements 10a, 10b, 10c . . . need not necessarily be limited to being identical devices or to elements measuring the same parameter; for example, where a wide range of temperatures are being recorded at different stations for the purpose of obtaining average conditions over a test interval, certain elements may have output voltage functions dissimilar to the outputs of other elements; in addition the individual elements may be concerned with recording the variations of a different parameter. In such instances the direct coupling of link 15 between motor 14 and the wiper of a linear slide-wire are retained, and a modifying cam and/or transmission will be introduced between the pinion 35 and the shaft of each of the counters, suitable unidiretcional clutches being employed to commence the angular displacement from the zero of the function for each reading.

In illustration of the foregoing, the drive and coupling elements between the motor and counters are shown in Figure 3, wherein a function conversion device 41 is interposed between the motor and a counter. The function converter 41 has an input shaft 43 and an output shaft 45, and is so designed that the ratio of angular displacements over a predetermined range of displacements represents the function by which the output voltage of a sensing element associated therewith is related to the absolute magnitude of a parameter. A coil spring 44 opposes the rotation of the shaft 43, and serves on release of gear 48 which is selectably engaged with drive gear 36 to return the convertor to its zero or reference condition. As the slidewire is swept by the motor, the output shaft 45 is rotated by an amount proportional to the input shaft rotation, modified by the function convertor 41. Clutch 46 on the shaft 45 is arranged to engage the gear or clutch 35 on the counter shaft for positive rotation but to release or disengage for reverse rotation, as when the coil spring 44 drives the converter shafts to the reference position. For example, a ratchet and pawl system may be employed, as shown in Fig. 5, as well as various other unidirectional clutch devices well known in the art.

The clutch may comprise a boss 46 fixed on the end of shaft 45 which carries the pawl 70 and associated captive spring 71, within an internally serrated ratchet ring 35. As will be directly understood by those familiar with pawl and ratchet devices, clockwise rotation of the shaft 45 here serves to rotate ring 35, whereas reverse rotation is ineffective. Accordingly it is arranged that the motor drive between the reference position and the position corresponding to a reading of the element will always be such as to cause a clockwise rotation of shaft 45.

Where different elements measuring several parameters or dissimilar sensing elements measuring the same parameter are served by a common servo-controlled recorder equipment, in the summing arrangement according to the invention, it is necessary to define the reference scale value or zero position from which each increment is computed, in terms of each parameter. More particularly, the reference electrical voltage employed with each sensing element should preferably be the voltage generated by that element at a scale reference magnitude. Nevertheless, reference voltages equivalent to other scale reference magnitudes may be employed, provided that these are known and may be the difference between such reference value and an arbitrary value can be directly determined when deriving average values of a reading. In some instances a predetermined fixed voltage may be used in lieu of the reference element 22; or a series of elements 22a, 22b, 22c . . . (not known) may be associated with the system of Figure 5 and selected in turn by an additional wiper and arc of contacts (not shown) ganged with the wipers 24 and 27, care being taken that the range of voltages along the slide wire includes both the reference values and any values read upon any of the sensing elements.

By the method proposed herein and with a suitable display of the group of counters 34a, 34b, etc., an average can be taken at any time for any one of the elements merely by noting the aggregate counter total for that element and dividing by the integer value showing the number of readings taken on the additional counter 42 which is ganged with the shaft 15. In this regard, counter 42 may be arranged to register a count for the cycle of readings of the several elements 10a, 10b, etc. either at the beginning of the cycle or at the end of the cycle. Accordingly in performing the averaging the person monitoring the apparatus will require to ascertain by simple inspection which of the counters have not had their incremental quantities summed for the particular cycle currently in progress.

I claim:

1. Integrating apparatus comprising a sensing element responsive to a parameter to generate a signal, a slide-wire bridge circuit including a servo-motor driven displaceable tapping arm for deriving a comparison voltage, a balancing amplifier having said signal and said comparison voltage as inputs and deriving an output which is applied to said servo-motor to displace said arm in such sense as to tend to balance said inputs, a reference voltage source, switching means cyclically effective to substitute said reference voltage for said signal input to the amplifier whereby to cause said tapping arm correspondingly to undergo displacements between a reference position and a measurement position, a summing counter, unidirectional drive means coupling said counter with said servomotor in drive relation to register said displacements as scalar increments of said parameter, and a cycle counter responsive to said switching means for registering the number of increments summed.

2. Integrating apparatus as in claim 1 wherein the signal is functionally related to the scalar value of the parameter and the derived comparison voltage is a linear function of the slide wire tapping arm displacement and said drive means coupling said counter and said servo-motor comprises a displacement function transformation device for driving said counter in linear scale representation of the magnitude of the parameter.

3. Apparatus as in claim 2 wherein the sensing element is adapted to generate a signal which is a function of temperature and the reference voltage source comprises a standardized thermocouple element maintained at a reference temperature.

4. Integrating apparatus comprising a sensing element effective to generate a signal voltage functionally related to the scalar value of a parameter, a slide-wire bridge circuit including a reference source of voltage and a reversible motor-driven displaceable tapping arm establishing an adjustable comparison source of voltage, means applying said signal and said comparison voltage as opposed inputs to a balancing amplifier which is adapted to derive an output voltage related to the sense of the difference between said inputs, means applying said output voltage to drive said motor whereby to displace the tapping arm in representation of the scalar value of the parameter and to tend to balance the inputs, a standard reference voltage source, switching means associated with said signal input means operative cyclically to substitute said reference voltage for said signal and to cause corresponding positive displacements of said tapping arm between a reference position and a measurement position and negative displacements in a reverse direction, a summing counter, unidirectional drive means between said counter and said motor effective solely to transform positive displacements of said arm into linear scale increments of said counter and a cycle counter actuated by said switching means to count the number of measurements recorded.

5. Apparatus as in claim 4 wherein the reference voltage is chosen equal to the signal voltage corresponding to a predetermined reference scale value of the parameter measured.

6. Apparatus as in claim 5 wherein a plurality of like sensing elements and a like plurality of summing counters are provided, and switching means select each of the said elements in turn and select a corresponding summing counter for operative association with said apparatus, and said cycle counter is actuated to record a count upon the completion of selections including all of the elements.

7. In measuring apparatus of the type comprising a sensing element adapted to generate an electrical voltage output signal whose magnitude is a function of the scalar value of a parameter, including a source of reference voltage, displaceable means for adjusting said source, a reversible setting motor operative to displace said means, a comparison amplifier having a pair of inputs connected with said source and said signal and adapted to derive an output voltage corresponding to the sense of the difference between said inputs, and means applying the output voltage to drive said motor in such sense as to tend to reduce the difference to zero and to position said displaceable means in representation of said scalar value, the improvement comprising a reference signal source, switching means for alternately applying said reference signal voltage or said output signal as input to the amplifier, whereby to cause the displaceable means alternately to assume a reference position and a measurement position, a summing counter, coupling means operatively linking said counter with said setting motor for unidirectional drive in synchronism with and in linear scale function transformation of the displacement of said means between the reference position and the measurement position, and a cycle counter responsive to said switching means for recording the number of measurements summed.

8. The improvement as claimed in claim 7 wherein the reference signal voltage is chosen equal to the output signal generated by the sensing element at a predetermined scale value of the parameter.

9. The improvement as claimed in claim 7 wherein a plurality of like sensing elements and a like plurality of summing counters are provided, and switching means select each of the said elements in turn and select a corresponding summing counter for operative association with said apparatus, and said cycle counter is actuated to record a count upon the completion of selections including all of the said elements.

References Cited in the file of this patent

UNITED STATES PATENTS

| | | |
|---|---|---|
| 2,039,404 | Green et al. | May 5, 1936 |
| 2,068,719 | Troutman | Jan. 26, 1937 |
| 2,207,715 | Bumstead | July 16, 1940 |
| 2,534,544 | Bush | Dec. 19, 1950 |
| 2,537,498 | Wickesser | Jan. 9, 1951 |
| 2,610,843 | Schellentrager | Sept. 16, 1952 |